3,473,526
CARDIAC PULSE-RATE MONITOR
Albert Dale Herman, Encino, and Herbert Zeppo Marx,
Palm Springs, Calif., assignors, by mesne assignments,
to Lifeguard Watch, Beverly Hills, Calif., a corporation of California
Filed July 14, 1967, Ser. No. 653,440
Int. Cl. A61b 5/02; G04b 45/00
U.S. Cl. 128—2.05                                                10 Claims

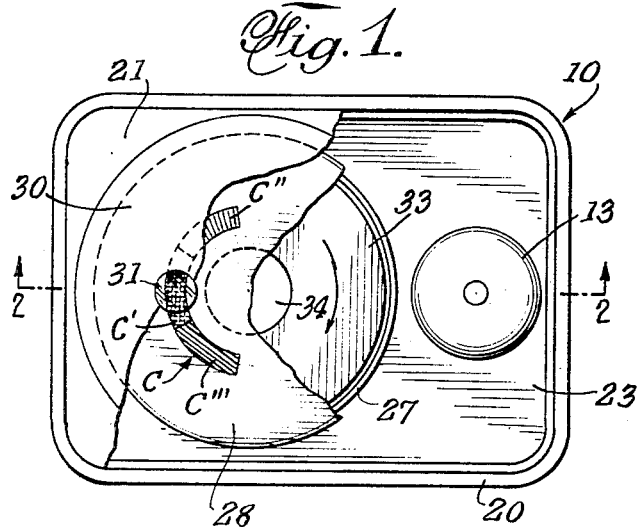
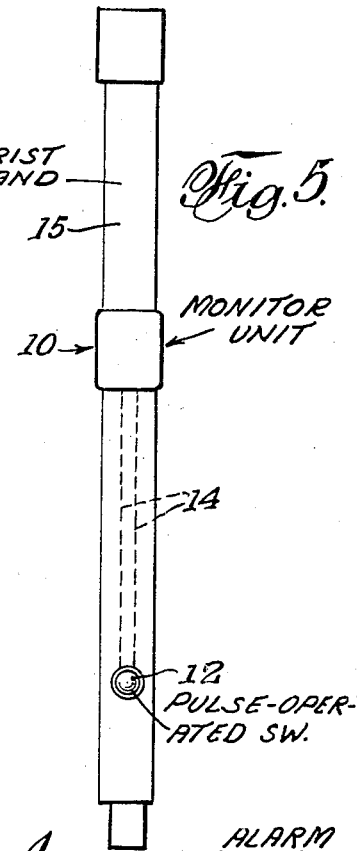
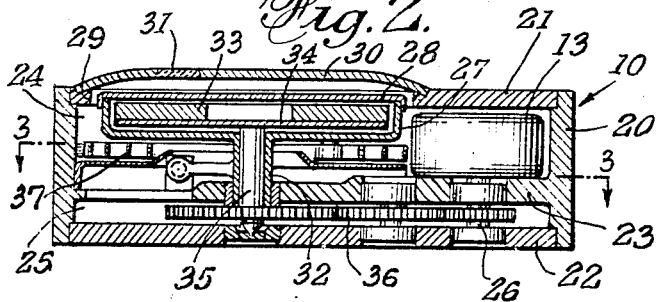
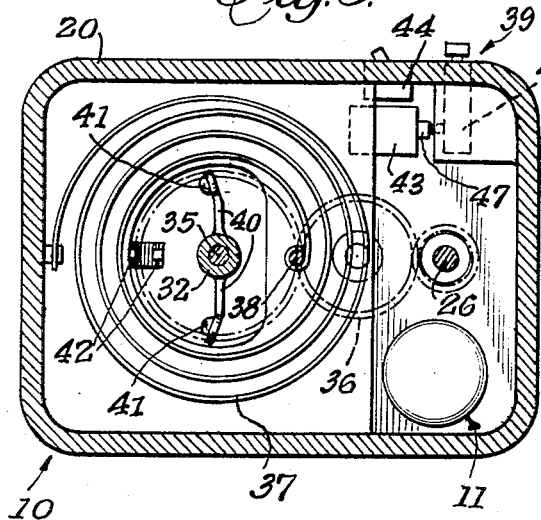
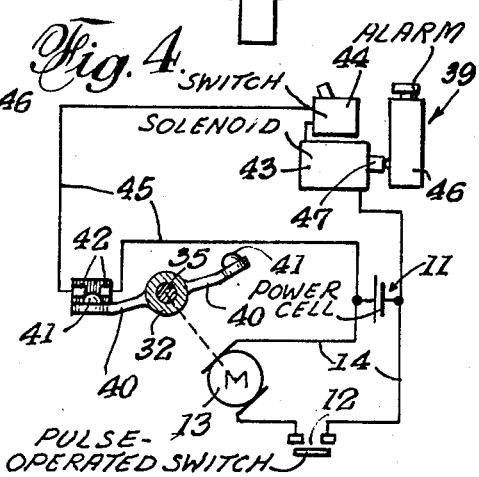
INVENTORS
ALBERT DALE HERMAN
HERBERT ZEPPO MARX
BY
C. G. Stratton
ATTORNEY

United States Patent Office 3,473,526
Patented Oct. 21, 1969

ABSTRACT OF THE DISCLOSURE

A unit to provide an audible and vibratory warning to advise persons who have cardiac impairment, of extreme variations in the pulse rate. The unit is provided with an electric motor that is operated by the power of a small electric cell in a circuit that is intermittently closed by a pulse-actuated switch and which rotates a permanent magnet. The latter is enclosed in a housing that is held in a position corresponding to normal by a hairspring, said housing, under drag of the magnetic field of the magnet, being moved rotationally in the direction of magnet rotation, when the pulse rate is above normal, due to a more continuous energizing of the motor by the pulse, and said housing, under bias of the hairspring, being moved rotationally counter to said magnetic drag when the pulse rate is subnormal. A color-coded telltale advises of lesser pulse-rate variations in either direction. An audible alarm is provided to warn of excessively high or abnormally low changes of the pulse rate.

BACKGROUND OF THE INVENTION

Monitoring of the rate, amplitude and/or regularity of the pulse of a person with a cardiac impairment is desirable at all times, but is especially important under circumstances during which the pulse rate, amplitude and/or regularity may be affected drastically as, for instance, during periods of excessive emotion and athletic or other physical activities.

One important purpose of the invention is to provide means to give notice of a change in the pulse in either direction from a norm, and to do this even during short periods of time, so that the person affected may take steps to ameliorate the conditions or cause of such a change, without having to resort to material changes in physical or mental activities. The norm or normal pulses of different people vary on a personal basis. Some people have low pulse rates that beat about fifty to sixty per minute; others have high pulse rates of seventy-five or more beats per minute; while still others have pulses that beat in the range between such low and high rates. All these different rates are normal for the individual, and it is with respect to the "personal" norm of an individual that this invention proposes to give notice of a change, up or down, in the pulse rate.

Another important purpose of the invention is to provide means, as above characterized, that advises, preferably by audible means, that the norm of the pulse beat has either been excessively exceeded or abnormally lowered, to advise, under either of said dangerous conditions, that cessation of physical activities is mandatory and that medication or medical assistance should be sought.

Ths invention also has for its objects to provide such means that are positive in operation, convenient in use, easily installed in a working position and easily disconnected therefrom, economical of manufacture, relatively simple, and of general superiority and serviceability.

The invention also comprises novel details of construction and novel combinations and arrangements of parts, which will more fully appear in the course of the following description, which is based on the accompanying drawing. However, said drawing merely shows, and the following description merely describes, one embodiment of the present invention, which is given by way of illustration or example only.

SUMMARY OF THE INVENTION

The pulse-rate monitor of the present invention comprises, generally, a unit 10 for providing both a visual and an audible warning of changes in the pulse, a power cell 11 preferably enclosed in said unit, a pulse-operated electric switch 12, and an electric motor 13, also enclosed in said unit. Said switch 12 controls an electric circuit 14 having the cell 11 and motor 13 in series, the latter being thereby energized and intermittently driven upon closing of the switch as effected by the pulse according to its rate, amplitude or regularity, or combinations of such pulse actions. Said unit 10 and power cell 11 are most advantageously mounted on a wristband 15 for application to the wrist in the manner of a wristwatch and so that the switch 12, on the inside of the band, may be in superposed engagement with the pulse in that area, and the face of the unit 10 may be visible to the wearer. A time-telling watch may, without invention, be provided on said band.

BRIEF DESCRIPTION OF THE DRAWING

In the drawing, like reference characters designate similar parts in the several views.

FIG. 1 is a top view, partly broken away, of a unit for providing both visual and audible warning of changes, from a norm, of the character of a cardiac pulse, as related to rate, amplitude and regularity thereof.

FIG. 2 is a cross-sectional view as taken on the line 2—2 of FIG. 1.

FIG. 3 is a cross-sectional view as taken on the plane of line 3—3 of FIG. 2.

FIG. 4 is a wiring diagram of electrical elements of the present cardiac pulse-rate monitor.

FIG. 5, to a reduced scale, shows a preferred means for mounting all the components of the monitor for operative engagement with the wrist.

DESCRIPTION OF THE PREFERRED EMBODIMENT

The unit 10 comprises a support housing 20 having a top wall 21, a bottom wall 22, and an intermediate wall 23, upper and lower chambers 24 and 25 being defined by said walls 21, 22 and 23. The walls 21 and 22 are removable cover walls to afford access to said chambers. The chamber 24 houses the electric motor 13, the driven shaft 26 of which extends through the wall 23 into the chamber 25. A freely rotational circular housing 27 is disposed in the chamber 24 and is provided with a top cover 28 that is exposed through an opening 29 in the housing wall 21. A snap-in cover plate 30 that is preferably opaque is fitted in said opening 29, the same being provided with an indicator window 31 through which a color-coded indicator C, on or applied to the top face of the rotational cover 28 of the mentioned rotational housing 27, is visible. Said housing 27 has a downwardly extending axial sleeve 32 that is rotatively guided in a bearing in the housing wall 23. The rotational housing 27 is made of a metal or material that is influenced by the rotating field of a magnet which, thereby, induces rotational movement of said housing around the axis of the sleeve 32 thereof.

A permanent magnet or magnets 33, of any suitable shape so long as the same have a clearance relationship to the inner face of the rotational housing 27, are mounted on a carrier plate 34 from which downwardly extends an arbor 35 within the sleeve 32, the end of said arbor having thrust bearing in the housing wall 22. Both said magnet or magnets and their carrier plate are clear of the walls of the housing 27 so the same may rotate independently of each other except when the field of said magnet induces a tendency in the housing to turn on the axis of the arbor and sleeve in the direction of rotation of the magnet. The plate 34 and arbor 35 are non-magnetic, as for instance, brass.

The motor 13, when energized by pulse closings of the switch 12, drives the arbor 35 to cause rotation of the magnet accordingly. In this case, a gear train 36 connecting the shaft 26 and the arbor 35, and disposed in the chamber 25, is shown as the drive means for the magnet 33. A hairspring 37 has one end thereof connected to the housing 20 and its other end to a pin 38 extending from the housing 27, the convolutions of said spring being formed in a manner to cause the housing to be biased by said spring in an opposite rotative direction than is caused by the magnet 33, when rotating.

The indicator window 31 is so located relative to the axis of rotation of the magnet 33 that the color-coded indicator C on the housing cover 28 is visible therethrough. In this case, the indicator is shown as arcuate and is divided into three sections, a yellow section C' that has a registering position with the window 31 when there is a balance between the bias of spring 37, in one direction, and the magnetic drag on the housing 27 by the rotating magnet 33, in the opposite direction. This position indicates normalcy in the heartbeat. When the monitor is not in use, it is without power because the normal state of the switch 12 is open; or, when the monitor is in use and the switch closings are slower than normal, of insufficient amplitude and/or irregular, the magnet rotation is, therefore, slower than normal and will result in an unbalanced condition wherein the hairspring will bias the housing 27 so a blue section C" of the indicator will be in register with said window 31, thereby visually showing a lower pulse than normal. When the pulse is faster than normal and for whatever other reasons the same closes the switch more frequently, the motor 13 will speed up, causing a speeding of the rotation of the magnet and, therefore, such increase in the drag on the housing 27 that the hairspring will become tensioned, allowing said housing to rotatively move to bring a third or red section, section C''' of the indicator, in register with the window 31.

It will be seen from the foregoing that the operation of this portion of the monitor is similar to that of a speedometer—magnet rotation causing advance of the housing 27 according to the speed of rotation of the magnet, and the hairspring causing the housing 27 to retract as such speed is reduced.

Alarm means 39, preferably audible, is provided to apprise of an abnormally large increase in pulse activity or a large decrease or substantially complete cessation of the pulse. Said means 39 is here shown as oppositely directed arms 40 on the sleeve 32 and provided with contact-bridging ends 41, a pair of spaced contacts 42 adapted to be bridged by either bridging of said bridging ends 41, a solenoid 43, and a manually set switch 44 connected in series with said contacts 42 and with the power cell 11, by an electric circuit 45, and an alarm device 46, of any suitable design, which is retained inoperative by the armature 47 of said solenoid when either or both switches 41, 42 or 44 are open.

When the pulse becomes dangerously high or low and the switch 44 is closed, the housing 27 will be rotated in one direction or the other until one of the contact-bridging ends 41 bridges the contacts 42, thereby closing circuit 45, energizing the solenoid 43 and causing the armature 47 to be retracted to release the alarm 46 which, then, will sound. Inspection of the indicator window 31 will show whether the alarm is sounding for a high or a low pulse. The alarm can be turned off by opening the switch 44 and the same may remain open except when the device is in active use.

Although this device is described as having a normally-open circuit 14 that is closed by the normally-open pulse-operated switch 12 to energize the motor 13, accordingly, it would be a mere reversal of the operation to substitute a normally-closed switch for the switch 12 so the circuit 14 is normally closed and is intermittently opened to de-energize the motor. Thus, a slowing of the motor, results in at corresponding reduction of the magnet rotation and provides a similar, but opposite movement of the housing 27 and the indicator C thereon than is caused by the described switch 12 and circuit 14.

While no adjustments are shown so the device may be specialized for persons having different norms of pulse, in this connection, the hairspring may be adjusted in any manner comparable to regulators used to adjust clocks, speedometers, and like devices.

One power cell 11 is shown. It is understood, however, that two separate cells may be provided, one for the circuit 14 and the other for the circuit 45.

While the foregoing has illustrated and described what is now contemplated to be the best mode of carrying out the invention, the construction is, of course, subject to modification without departing from the spirit and scope of the invention. Therefore, it is not desired to restrict the invention to the particular form of construction illustrated and described, but to cover all modifications that may fall within the scope of the appended claims.

Having thus described the invention, what is claimed and desired to be secured by Letters Patent is:

1. A cardiac pulse-rate monitor having a power source and a switch adapted to be intermittently actuated under control of pulsations of the pulse when in superposed contact with the pulse, said monitor comprising:
   (a) a support housing with an electric motor enclosed therein, and in electrical circuit with said power source and switch and intermittently operated upon said intermittent actuation of the switch,
   (b) a permanent magnet rotationally mounted in the support housing,
   (c) a drive connecting the motor and magnet to rotate said magnet at varying speeds according to the activity of the pulse with respect to rate, amplitude and regularity thereof,
   (d) a freely rotational housing member of magnetic material within which the magnet is located and which, under drag of the field of the magnet, is rotatively moved according to the speed of rotation of the magnet,
   (e) a spring to bias the member in a direction opposed to such magnetic drag, said drag and bias, when balanced differently, rotatively positioning the housing member in accordance with the degree of the drag, and
   (f) visual means provided on the housing member to indicate the pulse activtiy, as reflected by the amount and direction of rotative movement of the member.

2. A pulse-rate monitor according to claim 1 in which the rotational member is disposed within the support housing and in which
   (a) the monitor is provided with a top closure wall, and
   (b) said wall is provided with an indicator window through which the mentioned visual means is viewable.

3. A pulse-rate monitor according to claim 2 in which the visual indicator means comprises at least three differently colored sections which are respectively viewable through said window only when registered therewith according to the rotated position of the rotational member.

4. A pulse-rate monitor according to claim 3, the three colored sections of the visual indicator being arranged in arcuate form around and spaced from the axis of rotation of the rotational member, and the window being located in similar spaced relation to the axis.

5. A cardiac pulse-rate monitor according to claim 1 provided with:
   (a) an audible alarm housed in the support member, (b) releasable electrical means to keep the alarm inactive,
(c) a normally open switch and an electric circuit connecting the same with said releasable electrical means and said power source, and
(d) means carried by the rotatable member to close the normally open switch and thereby energize said electrical means to release the alarm for sounding thereof.

6. A pulse-rate monitor according to claim 5 in which a second and manual switch is embodied in said circuit in series with the normally open switch and the releasable electrical means.

7. A pulse-rate monitor according to claim 6, the switch-closing means comprising two terminal-bridging members that are circumferentially spaced from each other, one said bridging member closing the switch when the rotational member is rotatively moved in one direction, and the other bridging member closing the switch when the rotational member is rotatively moved in the opposite direction.

8. A pulse-rate monitor according to claim 7 in which
(a) the visual indicator means comprises at least three differently colored sections which are arranged in an arc spaced from and generated on the axis of the rotational member, and
(b) an indicator window is provided in the support housing for viewing said indicator means,
(c) the terminal-bridging members being circumferentially spaced in substantial conformity with the circumferential spacing of the extremes of the color indicator, and
(d) said bridging members, thereby, closing the normally open switch only when one of the extremes of the visual means is in register with the indicator windows.

9. A cardiac pulse-rate monitor according to claim 1 in which a mounting band for the monitor is provided, the same carrying the pulse-actuated switch and the support housing, the wires of the circuit between said switch and the motor and power source within the support housing extending along said band and between said support housing and switch.

10. A cardiac pulse-rate monitor according to claim 1 in which the switch is normally open and is intermittently closed when actuated under control of the pulse to intermittently close the electrical circuit to the motor.

References Cited

UNITED STATES PATENTS

| 576,180 | 2/1897 | Woodworth | 128—2.05 |
| 596,293 | 12/1897 | Woodworth | 128—2.05 |
| 1,881,389 | 10/1932 | Ricketts | 58—57 |
| 2,828,734 | 4/1958 | Johnson | 128—2.05 |
| 2,831,479 | 4/1958 | Briskier | 128—2.05 |
| 2,833,274 | 5/1958 | Reiss | 128—2.05 |
| 3,156,235 | 11/1964 | Jaeger | 128—2.05 |

WILLIAM E. KAMM, Primary Examiner